(12) United States Patent
Bergen et al.

(10) Patent No.: US 7,053,963 B2
(45) Date of Patent: May 30, 2006

(54) METHOD OF SWITCHING BETWEEN VIDEO SIGNALS IN AN IMAGE SWITCHING APPARATUS

(75) Inventors: Franciscus Herman Maria Bergen, Eindhoven (NL); Christiaan Clemens Maria Visschers, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 606 days.

(21) Appl. No.: 10/090,980

(22) Filed: Mar. 5, 2002

(65) Prior Publication Data

US 2002/0135684 A1    Sep. 26, 2002

(30) Foreign Application Priority Data

Mar. 9, 2001   (EP) ................................. 01200890

(51) Int. Cl.
*H04N 5/268*   (2006.01)

(52) U.S. Cl. ....................................... 348/705

(58) Field of Classification Search ................ 348/705, 348/707, 706, 552; 386/117, 120; H04N 5/268
See application file for complete search history.

(56) References Cited

U.S. PATENT DOCUMENTS

| 2,944,108 | A | * | 7/1960 | Houghton ................. 360/73.09 |
| 4,774,570 | A | | 9/1988 | Araki |
| 5,150,212 | A | | 9/1992 | Han |
| 5,671,009 | A | | 9/1997 | Chun |
| 6,185,367 | B1 | | 2/2001 | Keery et al. |

FOREIGN PATENT DOCUMENTS

| JP | 63 077285 A | 4/1988 |
| JP | 07 087373 A | 3/1995 |
| JP | 11 042210 A | 2/1999 |
| JP | 2000 156854 A | 6/2000 |
| WO | WO 99/49659 | 9/1999 |

OTHER PUBLICATIONS

Patent Abstracts of Japan, Araki Akishi: "Video Signal Processing Device," Publication No. 63077285, Jul. 4, 1988, Application No. 61222690, Sep. 20, 1986.
Patent Abstracts of Japan, Kawabata Takeshi: "Endoscope System," Publication No. 11042210, Feb. 16, 1999, Application No. 09199506, Jul. 25, 1997.

(Continued)

*Primary Examiner*—Sherrie Hsia
(74) *Attorney, Agent, or Firm*—Kenyon & Kenyon LLP

(57) ABSTRACT

A method of switching between video signals in an image switching apparatus is provided, which apparatus has a switch for switching between the video signal supplied by a camera and the video signal supplied by a recording apparatus, and a circuit for processing the video signal coming from the recording apparatus. The processing circuit compares the video signal coming from the recording apparatus with the video signal supplied by the camera and then sets an operating mode on the basis of the comparison result. The output signal from the recording apparatus is a signal which comes from a tape in the replay mode. In the recording and stop modes, the signal entering the recorder is looped through to the output of the video recorder. The two signals have a correlation to each other. A conclusion can thus be drawn on whether the image switching apparatus should work in the replay mode or the recording mode by simple comparison.

6 Claims, 2 Drawing Sheets

OTHER PUBLICATIONS

Patent Abstracts of Japan, Kudo Mitsuru: "Picture Processor," Publication No. 07087373, Mar. 31, 1995, Application No. 05186799, Jun. 30, 1993.

Patent Abstracts of Japan, Ume Shinkon: "Monitor Image Retrieving Device," Publication No. 2000156854, Jun. 6, 2000, Application No. 10330444, Nov. 20, 1998.

* cited by examiner

# METHOD OF SWITCHING BETWEEN VIDEO SIGNALS IN AN IMAGE SWITCHING APPARATUS

BACKGROUND OF THE INVENTION

1. Field of the Invention

The invention relates to a method of switching between video signal sin an image switching apparatus which has a switch for switching between a video signal supplied by a camera and a video signal supplied by a recording apparatus, and which has a circuit for processing the video signal coming from the recording apparatus.

2. Description of Related Art

Such a method for an image switching apparatus used in surveillance or monitoring systems, e.g. in stores, hotels or underground car parks, is known from U.S. Pat. No. 5,150, 212. The image switching apparatus works in two operating modes. The first operating mode is a recording mode, the second operating mode is a replay mode. In the recording mode, a control unit controls a switch to which the video signals of several cameras are connected. Individual images are filtered out from the video signals, given an address and recorded. The address identifies the camera. In the second operating mode a signal reproduced by the video recorder is detected from the address and delivered as an output to a corresponding monitor belonging to the camera. The circuit is of a complicated construction.

Such a method for an image switching apparatus is also known from WO 99/49 659. A video recorder is provided with an activation unit by means of which the image switching apparatus can be controlled into a first recording mode or a second replay mode. Adjustment means within the image switching apparatus set the operating mode to the record mode when a camera switching signal is received from the recorder, and to the replay mode when an address signal is detected within the video signal coming from the recorder. The circuit of the image switching apparatus is of a complicated construction.

BRIEF SUMMARY OF THE INVENTION

It is an object of the invention, therefore, to provide a method of controlling the image switching apparatus which can be easily implemented.

This object is achieved by means of the characterizing features of claim 1. According to the invention, the processing circuit compares the video signal coming from the recorder with the video signal supplied by the camera and then sets an operating mode on the basis of the comparison result. The output signal of the recorder is a signal coming from a tape in the replay mode. In the recording and stop modes, the signal entering the recorder is looped through the output of the video recorder. The two signals have a correlation to each other. A conclusion can thus be drawn on whether the image switching device should work in the replay mode or in the record mode by means of a simple comparison.

Advantageously, the time difference between the two video signals is determined in the comparison. If this falls below a preset value, it can be assumed that the video signal has been looped through and the record mode is set. The signal entering the image switching apparatus from the recorder only has a brief time delay of value less than 100 ns. If the recorder is in the replay mode, the two signals have no correlation to each other.

The synchronous pulses within the video signal can be taken into account in the comparison in a simple manner such that a distinction is made between the two operating modes.

Advantageously, the image contents are compared. If during switching of the recorder the synchronous pulses should happen to lie within the time limit, a simple comparison of the image contents will help distinguish between the signals. It is to be expected that the image received by the camera changes over time. A comparison of the current video signal with a recorded signal will then show no correlation between the image contents. Thus a conclusion may be drawn as to whether the signals are identical.

Advantageously, a simple comparison circuit, which compares the signal output from the camera with the signal supplied by the recorder, forces the switch of the image switching apparatus into the replay mode in the case of different signals; it is only in the record mode that the switch can be used for switching between cameras. The recording apparatus is also referred to below as the video recorder. VCR is the abbreviation for the British term Video Cassette Recorder, VTR the for the American term Video Tape Recorder, both simply referred to as video recorder below.

BRIEF DESCRIPTION OF THE SEVERAL VIEWS OF THE DRAWINGS

For a better understanding of the invention, embodiments will be explained below with reference to the drawings, in which.

DETAILED DESCRIPTION OF THE INVENTION

Figure 1:
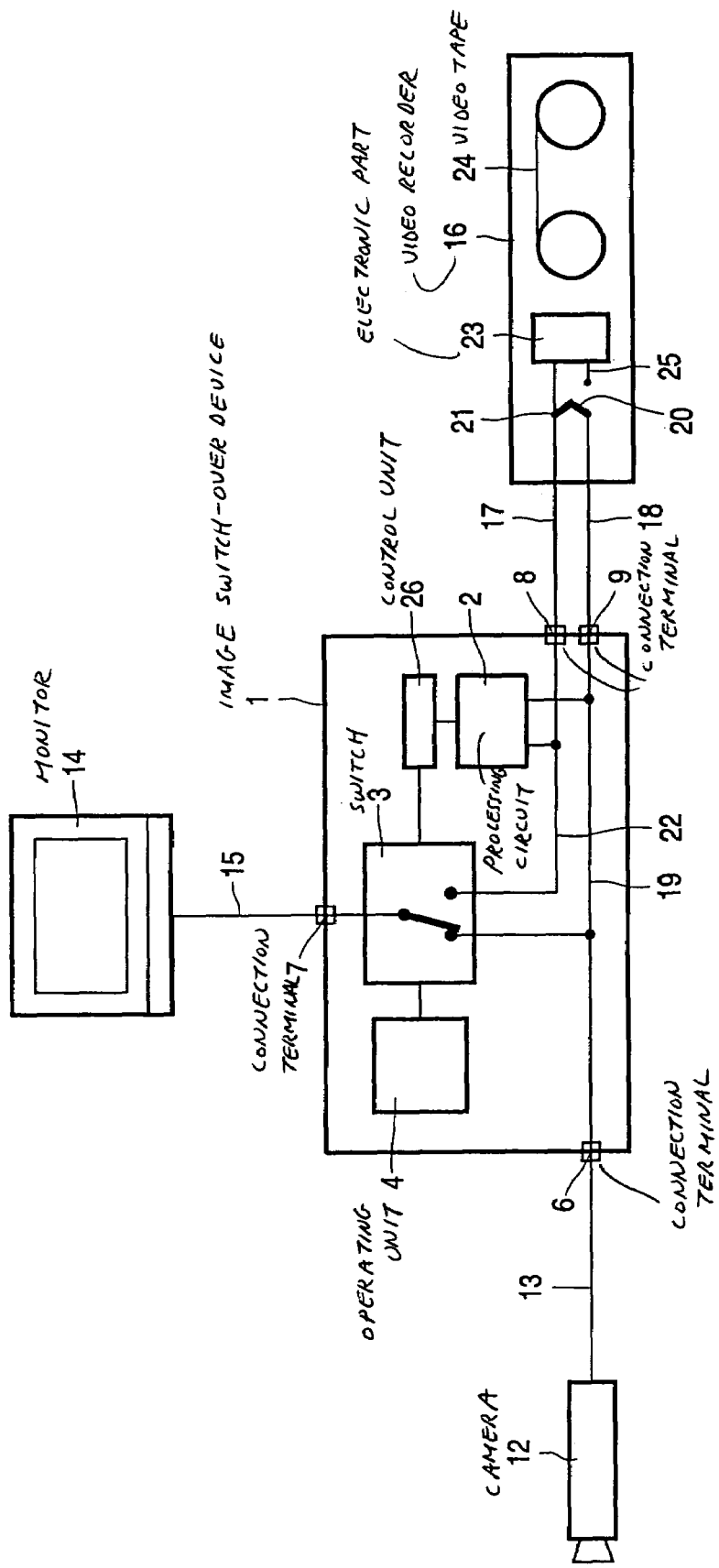
FIG. 1 is a block circuit diagram of an image switch-over apparatus with a monitor, a camera and a video recorder.

FIG. 1 shows an image switch-over apparatus 1 with a processing circuit 2, a switch 3, an operating unit 4 and connection terminals 6 to 9. A camera 12 is connected to a camera connection terminal 6 by means of a connecting cable 13. A monitor 14 is connected to a monitor connection terminal 7 by means of a connecting cable 15. The image switch-over device 1 and the monitor 14 are assembled into one constructional unit. A video recorder 16 is connected to connection terminals 8 and 9 by two connecting cables 17 and 18. The connection terminals 8 and 9 can be combined into one connection terminal and the cables 17 and 18 combined into one cable. The camera 12 sends a video signal via the connecting cables 13 and 18 and the connection terminals 6 and 9 and via an internal connecting cable 19 to the switch 3 and the video recorder 16. The video signal from the camera 12 reaches a junction point 21, which acts as distributor, via a switch 20 of the video recorder 16. From the distributor 21 the video signal passes via the connecting cable 17, the connection terminal 8, and an internal connecting cable 22 within the image switching apparatus 1 to the switch 3. The switch 3 can be controlled by an operator via the operating unit 4 so that the video signal coming from the camera 12 is picked up by line 19 or line 22. The video signal picked up by the line 22 is time-delayed in relation to the video signal picked up by the line 19, in other words the video signal of the camera 12, is given directly or indirectly to the switch 3 via the switch 20. From the switch 3, the video signal passes via the connection terminal 7 and the connecting cable 15 to the monitor 14. The video signal is passed from the distributor 21 to an electronic part 23 of the video recorder 16. The electronic part 23 stores the video signal on a tape 24. The video tape 24 serves as a storage medium.

The above describes a first operating mode in which the video signals from the camera 12 are made available directly or indirectly to the switch 3, and the operator decides via the operating unit 4 whether an image received by the camera 12 becomes visible on the monitor 14 immediately or with a delay in time. At the same time the video recorder 16 can be in the record or stop mode. This means that the video signal from the camera 12 may or may not be a recorded signal.

The image switching apparatus 1 is then set to a second operating mode if the switch 20 within the video recorder 16 switches and a video signal is to be output from the storage medium 24 via the electronic part 23, an internal connecting line 25 with the switch 20, the distributor 21, and the connecting line 176, etc., to the monitor 14. It must be ensured here that the switch 3 is switched to the internal line 22. If the switch 3 is switched through the internal line 19 and the connection terminal 6 to the camera 12, a malfunction arises. The processing circuit 2 will remedy this. This video signals transferred via lines 19 and 22 are compared in the processing circuit 2. If the video signal is looped through at switch 20, the same video signal will be present on the lines 19 and 22 with a time difference of less than 100 ns. The processing circuit 2 compares the signals, establishes a time offset between the two signals and checks whether the signals are identical. The processing circuit 2 works as a comparison and detection circuit. If a time offset greater than 100 ns and different signals are detected, the processing circuit 2 forces the switch 3 into a position which creates a connection between the storage medium 24 of the video recorder 16 and the monitor 14. This ensures that the image on the monitor 14 comes from the video recorder 16 in the replay mode. A malfunction is excluded. A display symbol indicates the status of the image switching apparatus 1, i.e. whether the image switching apparatus 1 is operating in the replay or the record mode. An item "VCR yes/no" is included in a menu of the image switching apparatus 1 as a safety feature for the case in which a non-standard video recorder 16 is used. A microprocessor acting as a control unit 26 between the comparison circuit 2 and the switch 3 controls the functions of the image switching apparatus 1.

Figure 2:
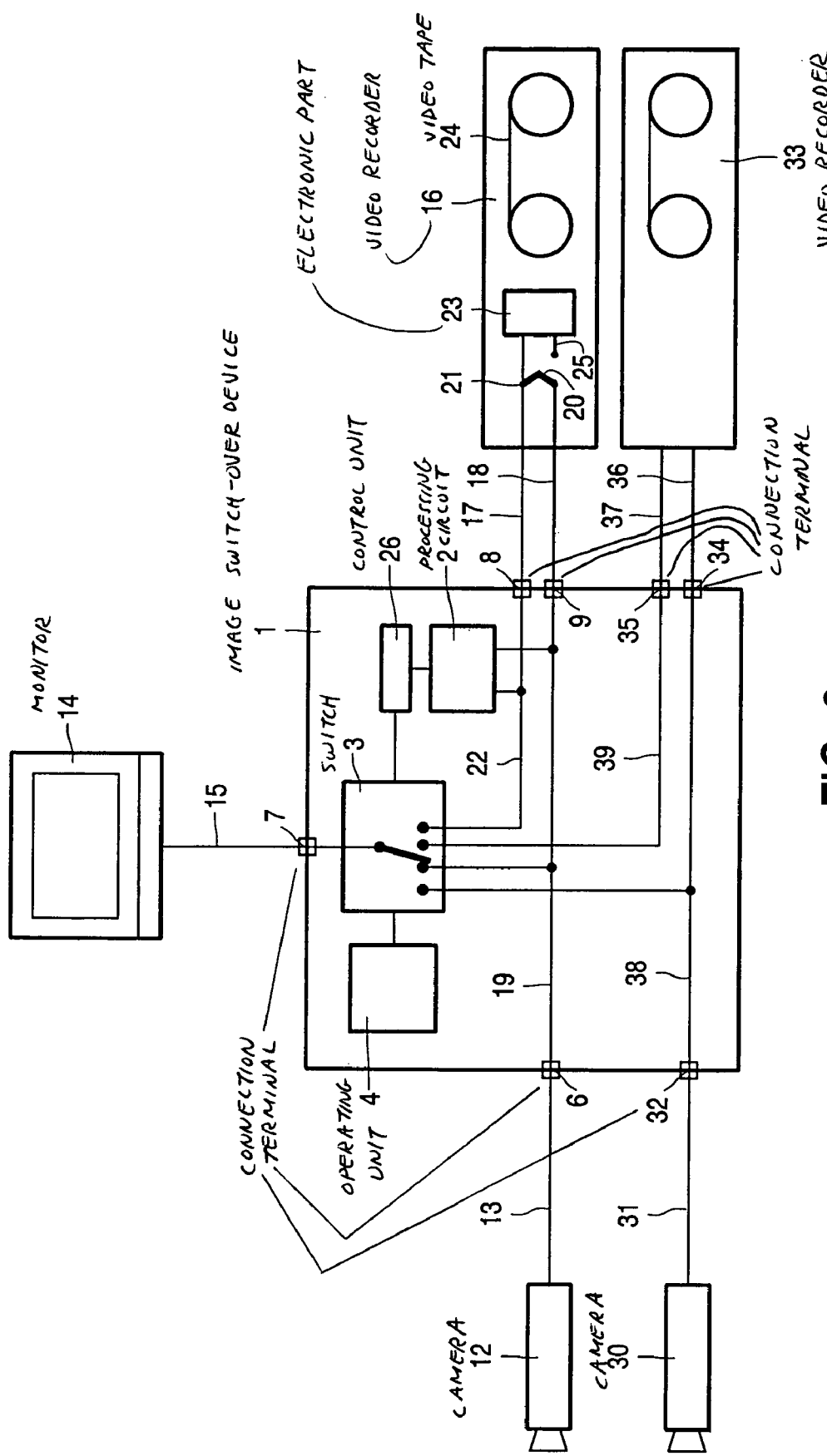
FIG. 2 is a block circuit diagram of an image switch-over apparatus with a monitor, two cameras and two video recorders.

FIG. 2 shows two cameras 12 and 30 connected via connecting cables 13 and 31 and connection terminals 6 and 32 to the image switching apparatus 1. For the second camera 30, a second video recorder 33 is connected to the image switching apparatus 1 via two connection terminals 34 and 35 and two connecting cables 36 and 37. The internal circuits of the video recorders 16 and 33 are identical. An internal line 38 connects the connection terminals 32 and 34 to the switch 3, a further internal line 39 connects the connection terminal 35 to the detection circuit 2 and the switch 3. The internal lines between the camera 30, the video recorder 33, the switch 3, and the detection circuit 2 run in the same way as the lines between the camera 12, the video recorder 16, the switch 3 and the detection circuit 2. The detection circuit 2 detects whether one of the two video recorders 16, 33 is working in the replay mode and forces the switch 3 into the mode so as to output the corresponding signal on the monitor 14. In the recording mode, the switch 3 can assume any position such that images from either camera 10, 12 appear on the monitor 14 directly or indirectly, i.e. with a time delay. In the replay mode, the switch 3 must assume a position such that it is switched through via the line 22 or 39 to the video recorder 16 or 33. A recorded image is then replayed, which image is supplied from either the video recorder 16 or the video recorder 33. A reference on the monitor can then indicate whether several video recorders 16, 33 are simultaneously in the replay mode and which video recorder 16, 33 is supplying the current picture to the monitor 14.

The invention claimed is:

1. A method of controlling an image switching apparatus, the image switching apparatus having a switch for switching between a video signal supplied by a camera and a video signal supplied by a recording apparatus, and a circuit for processing the video signal coming from the recording apparatus, the method comprising:

comparing, using the processing circuit, the video signal coming from the recording apparatus with the video signal supplied by the camera; and setting the switch into an operating mode selected on the basis of the comparison.

2. A method as claimed in claim 1, wherein the time difference between the two video signals is determined in said comparison.

3. A method as claimed in claim 2, wherein synchronous pulses within the two video signals are compared.

4. A method as claimed in claim 1, wherein the selected operating mode is chosen if the video signal supplied by the recording apparatus is different from the video signal supplied by the camera.

5. A method of controlling an image switching apparatus, the image switching apparatus having a switch for switching between a video signal supplied by a camera and a video signal supplied by a recording apparatus, and a circuit for processing the video signal coming from the recording apparatus, the method comprising:

comparing, using the processing circuit, the video signal coming from the recording apparatus with the video signal supplied by the camera, wherein the image contents are compared; and setting the switch into an operating mode selected on the basis of the comparison.

6. An image switching apparatus with a switch for switching between a video signal supplied by a camera and a video signal supplied by a recording apparatus, and a circuit for processing the video signal coming from the recording apparatus, wherein the processing circuit compares the signal output from the camera with the video signal supplied by the recording apparatus and forces the switch of the image switching apparatus into the replay mode if the signals are different.

* * * * *